US011323695B2

(12) United States Patent
Filippov et al.

(10) Patent No.: US 11,323,695 B2
(45) Date of Patent: May 3, 2022

(54) BIDIRECTIONAL INTRA PREDICTION SIGNALING

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/035,397

(22) Filed: Sep. 28, 2020

(65) Prior Publication Data

US 2021/0014482 A1 Jan. 14, 2021

Related U.S. Application Data

(63) Continuation of application No. PCT/EP2019/057838, filed on Mar. 28, 2019.

(30) Foreign Application Priority Data

Mar. 29, 2018 (WO) .............. PCT/RU2018/000206

(51) Int. Cl.
*H04N 19/105* (2014.01)
*H04N 19/11* (2014.01)
(Continued)

(52) U.S. Cl.
CPC ........... *H04N 19/105* (2014.11); *H04N 19/11* (2014.11); *H04N 19/132* (2014.11);
(Continued)

(58) Field of Classification Search
None
See application file for complete search history.

(56) References Cited

U.S. PATENT DOCUMENTS 10,034,003 B2 7/2018 Lim et al.
2011/0292994 A1* 12/2011 Lim .................... H04N 19/154
375/240.02
(Continued)

FOREIGN PATENT DOCUMENTS

CN 101179734 A 5/2008
CN 101267567 A 9/2008
(Continued)

OTHER PUBLICATIONS

Shiodera, T. et al., "CE6 Subset A: Bidirectional intra prediction (JCTVC-C079)", Joint Collaborative Team on Video Coding (JCT-VC) of ITU-T SG16 WP3 and ISO/IEC JTC1/SC29/WG11, No. JCTVC-D108, 4th Meeting: Daegu, KR, Jan. 20-28, 2011, XP030008148, total 14 pages.
(Continued)

*Primary Examiner* — Patricia I Young
(74) *Attorney, Agent, or Firm* — Slater Matsil, LLP

(57) ABSTRACT

Devices and methods for video coding are described. One method comprises receiving a bitstream, wherein the bitstream comprises prediction related information, and wherein the prediction related information includes at least one of: numbers and positions of available primary reference samples, an intra prediction mode index, or a size of the current coding block; determining whether a bidirectional intra prediction (BIP) flag is signaled in the bitstream based on the prediction related information; and reconstructing the picture.

18 Claims, 17 Drawing Sheets

(51) Int. Cl.
*H04N 19/159* (2014.01)
*H04N 19/176* (2014.01)
*H04N 19/46* (2014.01)
*H04N 19/91* (2014.01)
*H04N 19/132* (2014.01)

(52) U.S. Cl.
CPC ......... *H04N 19/159* (2014.11); *H04N 19/176* (2014.11); *H04N 19/46* (2014.11); *H04N 19/91* (2014.11)

(56) References Cited

U.S. PATENT DOCUMENTS

| | | | |
|---|---|---|---|
| 2013/0094581 A1* | 4/2013 | Tanizawa | H04N 19/129 375/240.12 |
| 2013/0114668 A1* | 5/2013 | Misra | H04N 19/117 375/240.02 |
| 2013/0287093 A1 | 10/2013 | Hannuksela et al. | |
| 2018/0213224 A1* | 7/2018 | Son | H04N 19/176 |
| 2019/0238837 A1 | 8/2019 | Filippov et al. | |
| 2019/0238838 A1 | 8/2019 | Filippov et al. | |
| 2019/0238843 A1 | 8/2019 | Filippov et al. | |

FOREIGN PATENT DOCUMENTS

| | | |
|---|---|---|
| CN | 102685506 A | 9/2012 |
| CN | 104641642 A | 5/2015 |
| CN | 106162197 A | 11/2016 |
| JP | 2014022787 A | 2/2014 |
| JP | 2015518338 A | 6/2015 |
| KR | 20130109976 A | 10/2013 |
| KR | 20180030791 A | 3/2018 |
| WO | 2017014412 A1 | 1/2017 |

OTHER PUBLICATIONS

Toshiba, "Bidirectional intra prediction", ITU-T SG16 Meeting; Geneva, No. T05-SG16-C-0181, Jun. 18, 2007, XP030003830, total 14 pages.

Filippov, A. et al., "CE3.7.2: Distance-Weighted Directional Intra Prediction (DWDIP)", also named: "CE3: Distance-weighted directional intra-prediction (Test 7.2.1)", Joint Video Experts Team (JVET) of ITU-T SG 16 WP 3 and ISO/IEC JTC 1/SC 29/WG 11, JVET-K0045-v1. 11th Meeting: Ljubljana, SI, Jul. 10-18, 2018, XP030195716, total 4 pages.

Bordes, P. et al., "Description of SDR, HDR and 360 video coding technology proposal by Qualcomm and Technicolor—medium complexity version", Joint Video Experts Team (JVET) of ITU-T SG 16 WP 3 and ISO/IEC JTC 1/SC 29/WG 11, No. JVET-J0022-v3, 10th Meeting: San Diego, US, Apr. 10-20, 2018, XP030151186, total 84 pages.

ITU-T H.263 (Aug. 5), Implementors Guide, (Aug. 5, 2005), Series H: Audiovisual and Multimedia Systems Coding of moving video, Implementors Guide for H.263: Video coding for low bit rate communication, total 10 pages.

ITU-T H.265 (Feb. 2018), Series H: Audiovisual and Multimedia Systems Infrastructure of audiovisual services—Coding of moving video, High efficiency video coding, Feb. 2018, total 692 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017, 812 pages.

ISO/IEC 23008-2:2013, Information technology—High efficiency coding and media delivery in heterogeneous environments, Part 2: High efficiency video coding , Dec. 1, 2013, 13 pages.

Sullivan, G., "Overview of the High Efficiency Video Coding (HEVC) Standard", in IEEE Transactions on Circuits and Systems for Video Technology, vol. 22, No. 12, Dec. 2012, 20 pages.

Huang, H. et al., EE2.1: Quadtree plus binary tree structure integration with JEM tools, Joint Video Exploration Team (JVET) of ITU-T SG 16 WP 3 and ISO/IEC JTC 1/SC 29/WG 11, JVET-C0024, 3rd Meeting: Geneva, CH, May 26-Jun. 1, 2016, 5 pages.

Zheng, A. et al., "Adaptive Block Coding Order for Intra Prediction in HEVC", IEEE Transactions on Circuits and Systems for Video Technology, vol. 26, No. 11, Nov. 2016, 7 pages.

"Future video coding: Joint Exploration Model 1 (JEM1) for future video coding investigation", Rapporteur Q6/16, International Telecommunication Union, Study Group 16, TD 213 (WP 3/16), Geneva, Oct. 12-23, 2015, 20 pages.

Shiodera, T. et al., "Block Based Extra/Inter-Polating Prediction for Intra Coding", IEEE International Conference on Image Processing (ICIP), 2007, 4 pages.

\* cited by examiner

LR_11

BIDIRECTIONAL INTRA PREDICTION SIGNALING

CROSS-REFERENCE TO RELATED APPLICATIONS

This application is a continuation of International Application No. PCT/EP2019/057838, filed on Mar. 28, 2019, which claims priority to International Application No. PCT/RU2018/000206, filed on Mar. 29, 2018. The disclosures of the aforementioned applications are hereby incorporated by reference in their entireties.

TECHNICAL FIELD

The disclosure relates to the field of video coding. More specifically, the disclosure relates to a method for a bidirectional intra prediction mode signaling mechanism as well as a video encoder and a video decoder.

BACKGROUND

Digital video communication and storage applications are implemented by a wide range of digital devices, e.g., digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/Advanced Video Coding (AVC) or ITU-T H.265/High Efficiency Video Coding (HEVC), provide a good tradeoff between these parameters.

Next Generation Video Coding (NGVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). NGVC is being developed in response to the previous H.265/HEVC (High Efficiency Video Coding) standard. Similar to previous video coding standards, NGVC includes basic functional modules such as intra/inter prediction, Transform, quantization, in-loop filtering, and entropy coding.

The coding standards, including NGVC, are based on partitioning of a source picture into video coding blocks, e.g., coding units (CUs). Each of the CUs can be further split into either smaller CUs or prediction units (PUs). Processing of these blocks depend on their size, spatial position and a coding mode specified by an encoder. Coding modes can be classified into two groups according to the type of prediction: intra- and inter-prediction modes. Intra prediction modes use pixels of the same picture (also referred to as frame or image) to generate reference samples to calculate the prediction values for the pixels of the block being reconstructed. Intra prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction.

When one of the prediction modes is selected for the current CU or PU, the prediction value is generated by extrapolation using the already coded pels surrounding the current CU or PU. For the bidirectional prediction method, the prediction value is generated in combination with two kinds of the intra prediction modes at each sub-block. A set of bidirectional intra prediction modes are introduced in the state-of-the-art, which needs a high bitrate.

SUMMARY

It is an object of the disclosure to provide improved devices and methods for video coding, which allow reducing the high bitrate caused by introducing a set of bidirectional intra prediction modes.

Embodiments of the disclosure are described in the claims and in the below description.

The scope of protection is defined by the claims.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF ILLUSTRATIVE EMBODIMENTS

In the following description, reference is made to the accompanying drawings, which form part of the disclosure, and in which are shown, by way of illustration, specific aspects in which the disclosure may be placed.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

In order to reduce the high bitrate caused by introducing a set of bidirectional intra prediction modes, such as the signaling overhead by adding a bidirectional intra prediction (BIP) flag to a bitstream, any one of the following three techniques may be implemented:

bidirectional intra prediction modes are not signaled and not used;
bidirectional intra prediction modes are not signaled and used by default instead of conventional directional intra prediction modes; or
bidirectional intra prediction modes are signaled using Context-Adaptive Binary Arithmetic Coding (CABAC) contexts.

These techniques are described further below with reference to various examples.

The following factors may be taken into account to decide whether a BIP flag should be put into a bitstream or what CABAC context should be selected as described below:

number and position of available primary reference samples;
intra prediction mode index;
aspect ratio of a block being predicted; and/or
size of a block being predicted.

Figure 1:
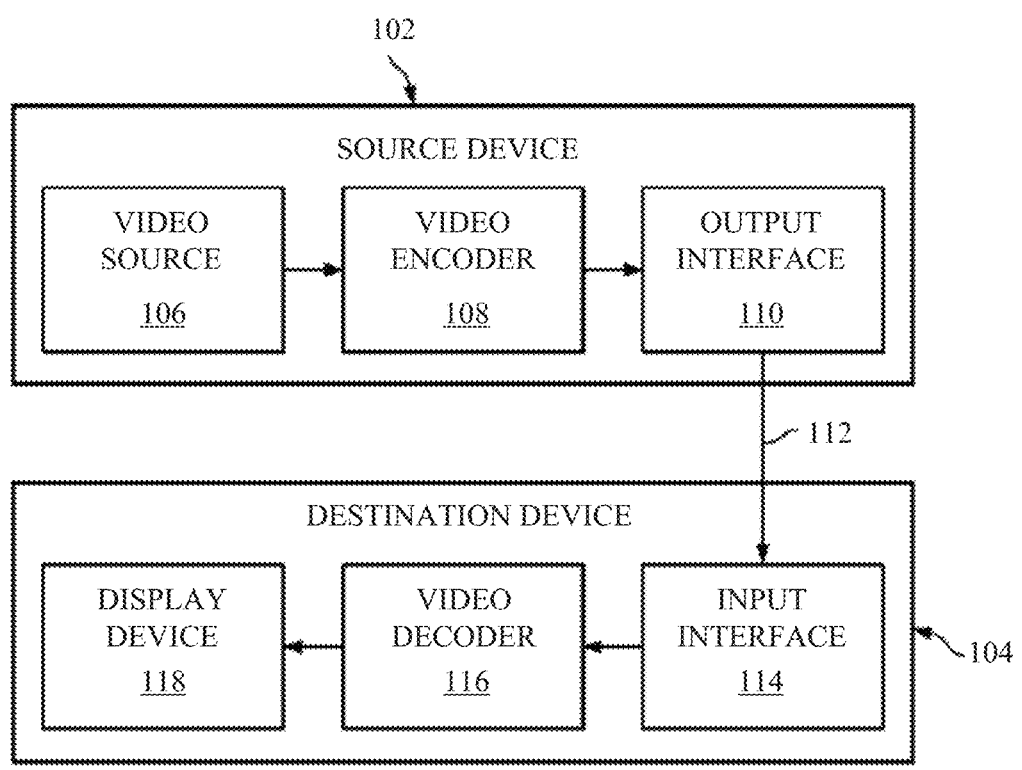
FIG. 1 shows a schematic diagram illustrating an example of a video encoding and decoding system 100.
Figure 2:
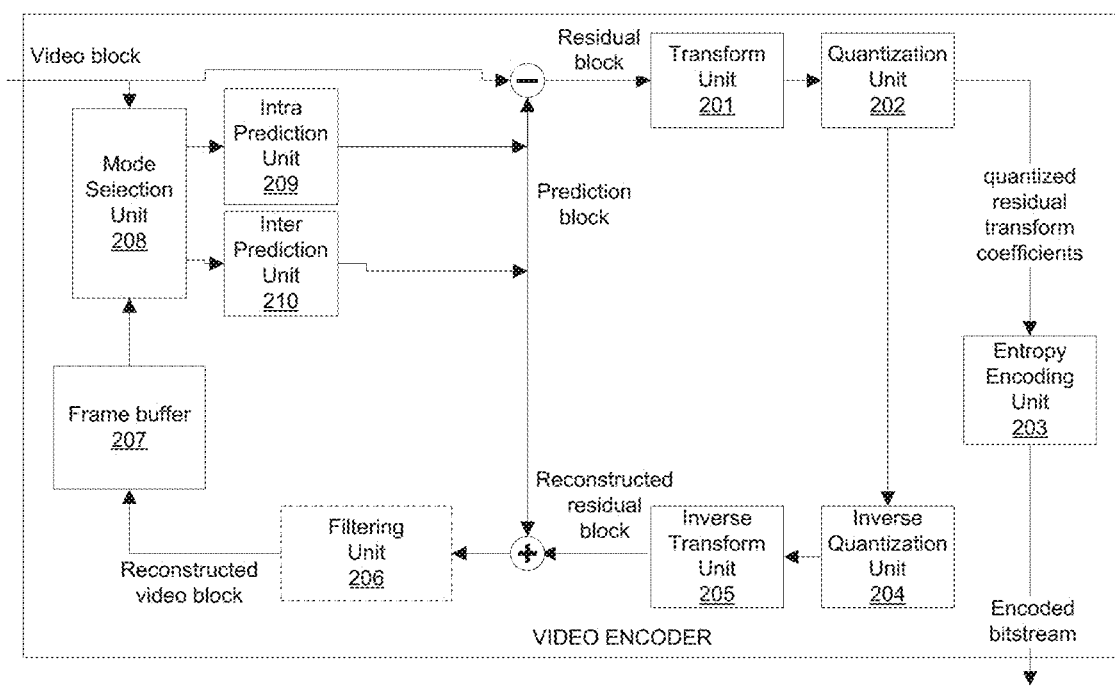
FIG. 2 shows a schematic diagram illustrating an example of a video encoder 200.
Figure 3:
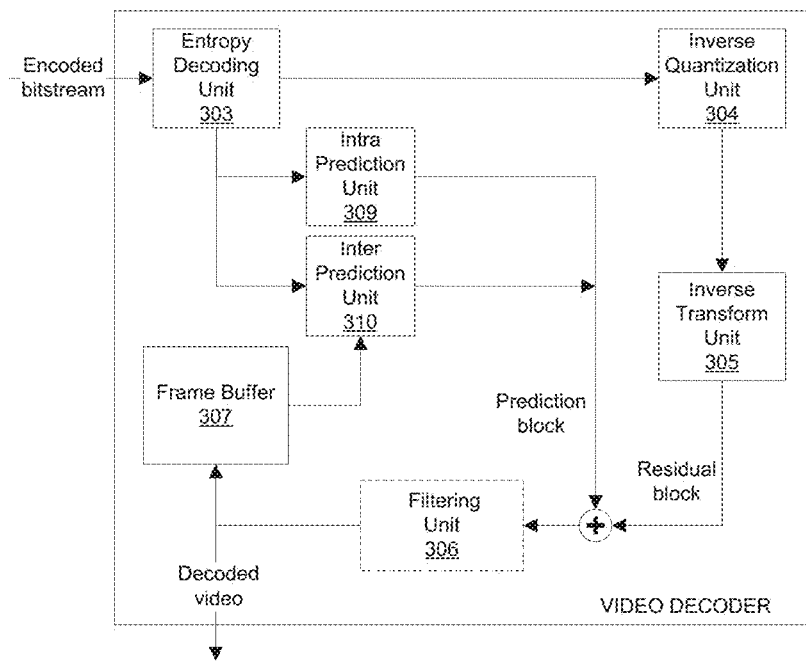
FIG. 3 shows a schematic diagram illustrating an example of a video decoder 300.

FIG. 1 is a block diagram illustrating an example video encoding and decoding system 100 that may utilize the techniques described in this disclosure, including techniques for encoding and decoding blocks in an intra prediction mode. As shown in FIG. 1, system 100 includes a source device 102 that generates encoded video data to be decoded at a later time by a destination device 104. Video encoder 200 as shown in FIG. 2, is an example of the source device 102. Video decoder 300 as shown in FIG. 3, is an example of the destination device 104. Source device 102 and destination device 104 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 102 and destination device 104 may be equipped for wireless communication.

Destination device 104 may receive the encoded video data to be decoded via a link 112. Link 112 may include any type of medium or device capable of moving the encoded video data from source device 102 to destination device 104. In one example, link 112 may comprise a communication medium to enable source device 102 to transmit encoded video data directly to destination device 104 in real-time. The encoded video data may be modulated according to a communication standard, such as a wireless communication protocol, and transmitted to destination device 104. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 104.

Alternatively, encoded data may be output from output interface 110 to a storage device (not shown in FIG. 1). Similarly, encoded data may be accessed from the storage device by input interface 114. Destination device 104 may access stored video data from storage device via streaming or download. The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 100 may be configured to support one-way or two-way video transmission to support applications such as video streaming, video playback, video broadcasting, and/or video telephony.

In the example of FIG. 1, source device 102 includes a video source 106, video encoder 108 and an output interface 110. In some cases, output interface 110 may include a modulator/demodulator (modem) and/or a transmitter. In source device 102, video source 106 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 106 is a video camera, source device 102 and destination device 104 may form so-called camera phones or video phones. However, the techniques described in this disclosure may be applicable to video coding in general, and may be applied to wireless and/or wired applications.

The captured, pre-captured, or computer-generated video may be encoded by video encoder 108. The encoded video data may be transmitted directly to destination device 104 via output interface 110 of source device 102. The encoded video data may also (or alternatively) be stored onto the storage device for later access by destination device 104 or other devices, for decoding and/or playback.

Destination device 104 includes an input interface 114, a video decoder 116, and a display device 118. In some cases, input interface 114 may include a receiver and/or a modem. Input interface 114 of destination device 104 receives the encoded video data over link 112. The encoded video data communicated over link 112, or provided on the storage device, may include a variety of syntax elements generated by video encoder 108 for use by a video decoder, such as video decoder 116, in decoding the video data. Such syntax elements may be included with the encoded video data transmitted on a communication medium, stored on a storage medium, or stored a file server.

Display device 118 may be integrated with, or external to, destination device 104. In some examples, destination device 104 may include an integrated display device and also be configured to interface with an external display device. In other examples, destination device 104 may be a display device. In general, display device 118 displays the decoded video data to a user, and may comprise any of a variety of display devices such as a liquid crystal display (LCD), a plasma display, an organic light emitting diode (OLED) display, or another type of display device.

Video encoder 108 and video decoder 116 may operate according to all kind of video compression standards, includes but not limited to MPEG-2, MPEG-4, ITU-T H.263, ITU-T H.264/MPEG-4, Part 10, Advanced Video Coding (AVC), the High Efficiency Video Coding (HEVC), ITU-T H.266/Next Generation Video Coding (NGVC) standard.

It is generally contemplated that video encoder 108 of source device 102 may be configured to encode video data according to any of these current or future standards. Similarly, it is also generally contemplated that video decoder 116 of destination device 104 may be configured to decode video data according to any of these current or future standards.

Video encoder 108 and video decoder 116 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 108 and video decoder 116 may be included in one or more encoders or decoders, either of which may be integrated as part of a combined encoder/decoder (CODEC) in a respective device.

In video coding specifications, a video sequence typically includes a series of pictures. Pictures may also be referred to as "frames." Video encoder 108 may output a bitstream that includes a sequence of bits that forms a representation of coded pictures and associated data. Video decoder 116 may receive a bitstream generated by video encoder 108. In addition, video decoder 116 may parse the bitstream to obtain syntax elements from the bitstream. Video decoder 116 may reconstruct the pictures of the video data based at least in part on the syntax elements obtained from the bitstream. The process to reconstruct the video data may be generally reciprocal to the process performed by video encoder 108.

FIG. 2 shows a schematic diagram illustrating an example of a video encoder 200. The video encoder 200 comprises an input for receiving input blocks of frames or pictures of a video stream and an output for generating an encoded video bit stream. The video encoder 200 is adapted to apply prediction, transformation, quantization, and entropy coding to the video stream. The transformation, quantization, and entropy coding are carried out respectively by a transform unit 201, a quantization unit 202 and an entropy encoding unit 203 so as to generate as an output the encoded video bit stream.

The video stream corresponds to a plurality of frames, wherein each frame is divided into blocks of a certain size that are either intra or inter coded. The blocks of for example the first frame of the video stream are intra coded by means of an intra prediction unit 209. An intra frame is coded using only the information within the same frame, so that it can be independently decoded and it can provide an entry point in the bit stream for random access. Blocks of other frames of the video stream are inter coded by means of an inter prediction unit 210: information from coded frames, which are called reference frames, are used to reduce the temporal redundancy, so that each block of an inter coded frame is predicted from a block of the same size in a reference frame. A mode selection unit 208 is adapted to select whether a block of a frame is to be processed by the intra prediction unit 209 or the inter prediction unit 210.

For performing inter prediction, the coded reference frames are processed by an inverse quantization unit 204, an inverse transform unit 205, a filtering unit 206 (optional) so as to obtain the reference frames that are then stored in a frame buffer 207. Particularly, reference blocks of the reference frame can be processed by these units to obtain reconstructed reference blocks. The reconstructed reference blocks are then recombined into the reference frame.

The inter prediction unit 210 comprises as input a current frame or picture to be inter coded and one or several reference frames or pictures from the frame buffer 207. Motion estimation and motion compensation are applied by the inter prediction unit 210. The motion estimation is used to obtain a motion vector and a reference frame based on certain cost function. The motion compensation then describes a current block of the current frame in terms of the transformation of a reference block of the reference frame to the current frame. The inter prediction unit 210 outputs a prediction block for the current block, wherein said prediction block minimizes the difference between the current block to be coded and its prediction block, i.e. minimizes the residual block. The minimization of the residual block is based e.g., on a rate-distortion optimization procedure.

The difference between the current block and its prediction, i.e. the residual block, is then transformed by the transform unit 201. The transform coefficients are quantized and entropy coded by the quantization unit 202 and the entropy encoding unit 203. The thus generated encoded video bit stream comprises intra coded blocks and inter coded blocks.

FIG. 3 shows a schematic diagram illustrating an example of a video decoder 300.

The video decoder 300 comprises particularly a frame buffer 307, an inter prediction unit 310. The frame buffer 307 is adapted to store at least one reference frame obtained from the encoded video bit stream. The inter prediction unit 310 is adapted to generate a prediction block of a current block of a current frame from a reference block of the reference frame.

The decoder 300 is adapted to decode the encoded video bit stream generated by the video encoder 200, and both the decoder 300 and the coder 200 generate identical predictions. The features of the frame buffer 307, the inter prediction unit 310 are similar to the features of the frame buffer 207, the inter prediction unit 210, of FIG. 2.

Particularly, the video decoder 300 comprises units that are also present in the video encoder 200 like e.g., an inverse quantization unit 304, an inverse transform unit 305, a filtering unit 306 (optional) and an intra prediction unit 309, which respectively correspond to the inverse quantization unit 204, the inverse transform unit 205, the filtering unit 206 and the intra prediction unit 209 of the video encoder 200. An entropy decoding unit 303 is adapted to decode the received encoded video bit stream and to correspondingly obtain quantized residual transform coefficients. The quantized residual transform coefficients are fed to the inverse quantization unit 304 and an inverse transform unit 305 to generate a residual block. The residual block is added to a prediction block and the addition is fed to the filtering unit 306 to obtain the decoded video. Frames of the decoded video can be stored in the frame buffer 307 and serve as a reference frame for inter prediction.

Figure 4:
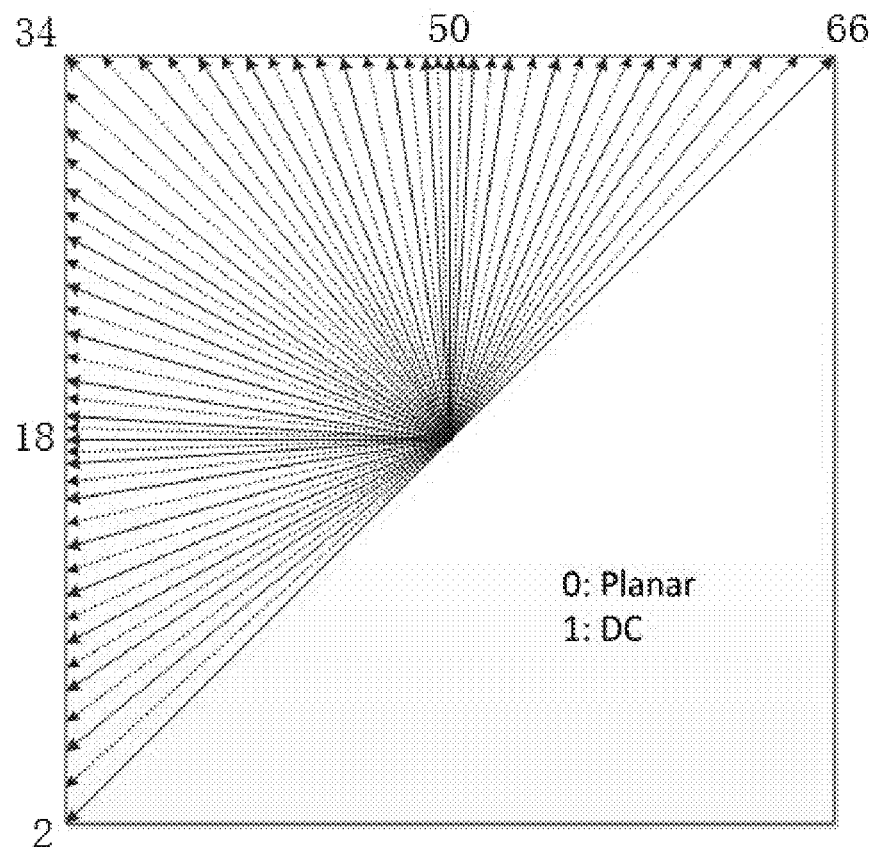
FIG. 4 shows a schematic diagram illustrating proposed 67 intra prediction modes.

According to the HEVC/H.265 standard, 35 intra prediction modes are available. As shown in FIG. 4, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG. 4. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (if needed) filter them to get a pixel predictor. The number of reference samples required for constructing a predictor depends on the length of the filter used for interpolation (e.g., bilinear and cubic filters have lengths of 2 and 4, respectively).

Figure 5A:
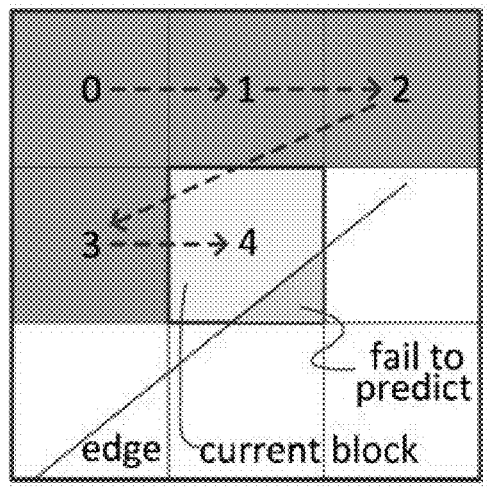
FIG. 5A shows an example of a fixed block coding order (BCO)
Figure 5B:
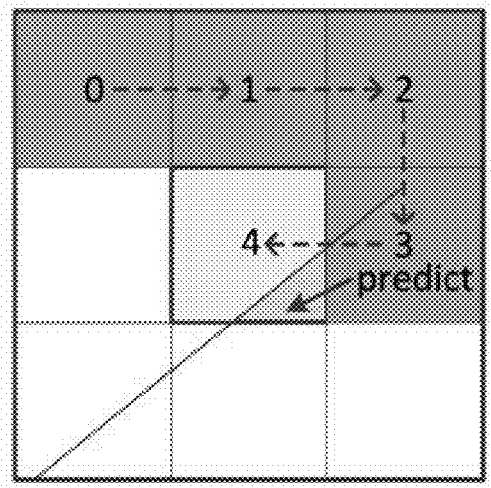
FIG. 5B shown an example of a flexible Block Coding Order (FBCO)

In order to take advantage of availability of reference samples that are used at the stage of intra prediction, a more flexible block coding order (BCO) is introduced, as schematically illustrated by the example at FIG. 5B. Comparing to an example of a fixed block coding order (BCO) as illustrated at FIG. 5A, flexible block coding order (FBCO) as illustrated at FIG. 5B, is a block coding order mechanisms that enables a non-fixed block coding order. FBCO encompasses different mechanisms such as Split Unit Coding Order (SUCO), Arbitrary Block Coding Order (ABCO), and others. For example, FBCO can be used at FIGS. 9, 12 and 15. With FBCO, not only top and left (LR_10) reference sample sides can be available for intra prediction but also, for example, top and right (LR_01) sides as well as three (top, left and right) sides. However, in some cases, even for blocks located not on a picture boundary, only one (namely, top) side can be available that is impossible for partitioning frameworks with fixed BCO.

Bidirectional Intra prediction (BIP) is a mechanism of constructing a directional predictor by generating a prediction value in combination with two kinds of the intra prediction modes within each block. Distance-Weighted Direction Intra Prediction (DWDIP) is a particular implementation of BIP. Generating a predictor by DWDIP includes the following two steps:

a) Initialization where secondary reference samples are generated; and b) Generate a predictor using a distance-weighted mechanism.

Both primary and secondary reference samples can be used at b) step.

Figure 6:
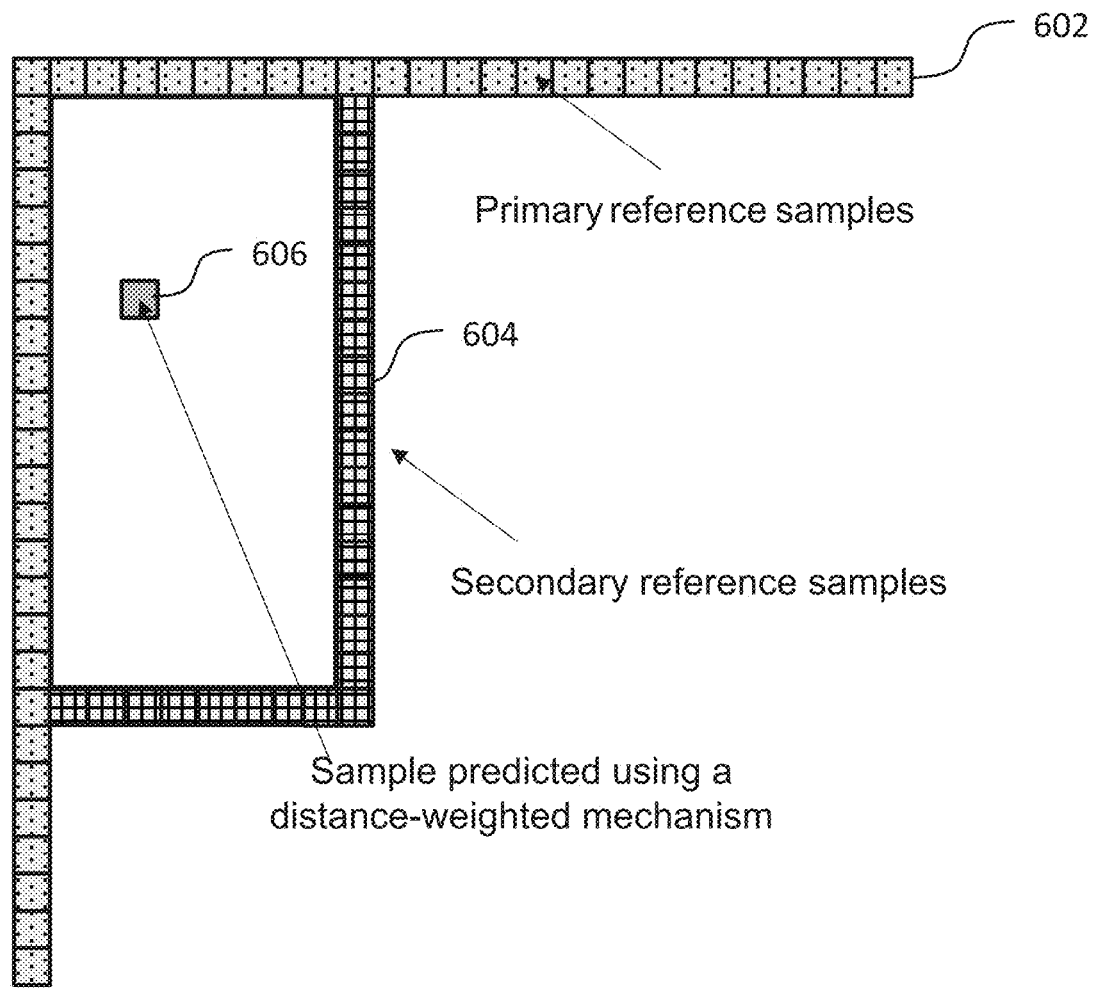
FIG. 6 shows a schematic diagram illustrating Generalized DWDIP.

Samples within the predictor are calculated as a weighted sum of reference samples defined by the selected prediction direction and placed on opposite sides as shown in FIG. 6. Prediction of a block may include steps of generating secondary reference samples that are located on the sides of the block that are not yet reconstructed and to be predicted, i.e. unknown pixels. Values of these secondary reference samples are derived from the primary reference samples which are obtained from the pixels of the previously reconstructed part of the picture, i.e., known pixels. That means primary reference samples 602 are taken from adjacent blocks. Secondary reference samples 604 are generated using primary reference samples 602. In FIG. 6, the primary reference pixels/samples 602 are identified by squares with dots, and the secondary reference pixels/samples 604 are identified by squares with grids. A pixels/samples 606 are predicted using a distance-weighted mechanism.

The flag of BIP based modes is always signaled in conventional methods, which causes signaling overhead in the bitstream.

Figure 7A:
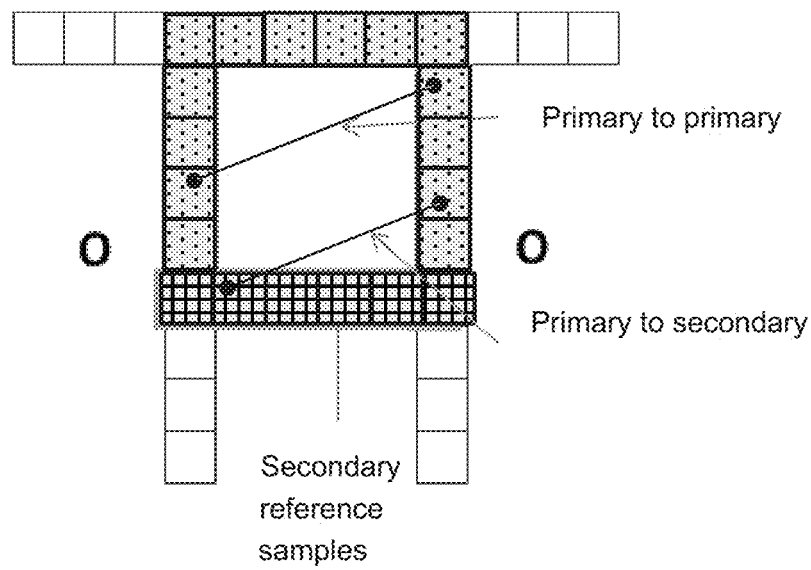
FIGS. 7A and 7B shows a relationship between primary reference samples and the accuracy of a constructed predictor.
Figure 7B:
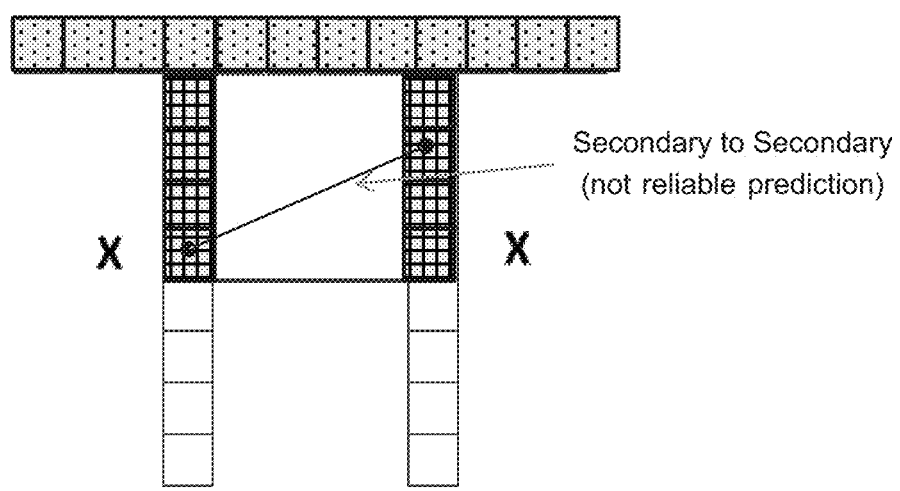
Figure 8:
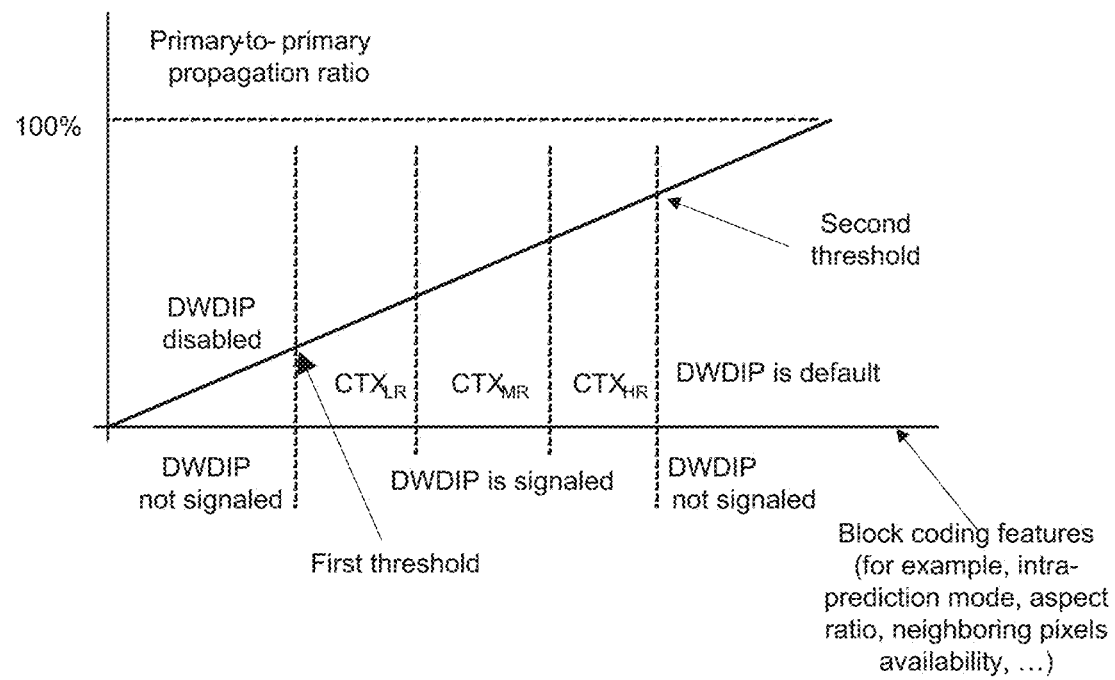
FIG. 8 shows a relationship between a primary-to-primary propagation ratio with BIP being signaled or not.

As secondary reference samples are typically not as close to source pixels as primary reference samples, the more pixels within a block are predicted using only primary reference samples, the higher the probability is that a constructed predictor is closer to an original block, as illustrated at FIG. 7A and FIG. 7B. FIGS. 7A and 7B schematically illustrate the relationship between the primary reference samples and the accuracy of the constructed predictor. In view of this, the ratio of the number of pixels generated using primary-to-primary prediction to the entire number of pixels within a block is used to make decisions on what context should be selected to signal BIP. Primary-to-primary propagation ratio is a ratio of the number of pixels that are predicted from two primary references to the total number of pixels in the block. As shown in FIG. 8, when the primary-to-primary propagation ratio is below a first threshold, BIP is disabled and a corresponding flag is not signaled. When the primary-to-primary propagation ratio is above a second threshold, BIP is used by default and corresponding flag is not signaled. When the primary-to-primary propagation ratio is between the first threshold and the second threshold, BIP is signaled using CABAC contexts. Different scenarios are discussed below for detail.

BIP is Disabled and Corresponding Flag is not Signaled

For a block of width w and height h being intra-predicted using mode $I_{IPM}$, BIP is disabled and a corresponding flag is not signaled if any of the following conditions is true:

Top side of neighboring pixels is not available

Left and right sides of neighboring pixels are not available w=a minimum size and h=a minimum size, for example, the minimum size is 4 w>a first maximum threshold, for example the first maximum threshold is 32 h>a second maximum threshold, for example the second maximum threshold is 32

Only left or right side is available and one of the following is true:

w=a minimum size and the number of intra prediction mode differs from the number of horizontal one by a third threshold or less; or h=a minimum size and the number of intra prediction mode differs from the number of vertical one by a fourth threshold or less. The third threshold may be same as or different from the fourth threshold. For example, the third threshold is same as the fourth threshold, and may be five (5).

Left and right sides of neighboring pixels are available, and either $I_{IPM}$=47 (intra prediction direction is horizontal), or $I_{IPM}$ is less than range start value or $I_{IPM}$ is greater than range end value. Start and end values are specified in Table 1 for a given block aspect ratio, i.e. log 2(w)−log 2(h).

$I_{IPM}$>2 (intra prediction is angular)

Top side of neighboring pixels means a primary reference sample in top sides of the current coding block. Correspondingly, left side of neighboring pixels means a primary reference sample in left sides of the current coding block. Right side of neighboring pixels means a primary reference sample in right sides of the current coding block.

TABLE 1

Dependency of the range start and end values on block aspect ratio

| log2(w) − log2(h) | −3 | −2 | −1 | 0 | 1 | 2 | 3 |
|---|---|---|---|---|---|---|---|
| Range start value | 3 | 3 | 6 | 11 | 16 | 17 | 17 |
| Range end value | 50 | 50 | 53 | 59 | 63 | 64 | 64 |

Figure 9:
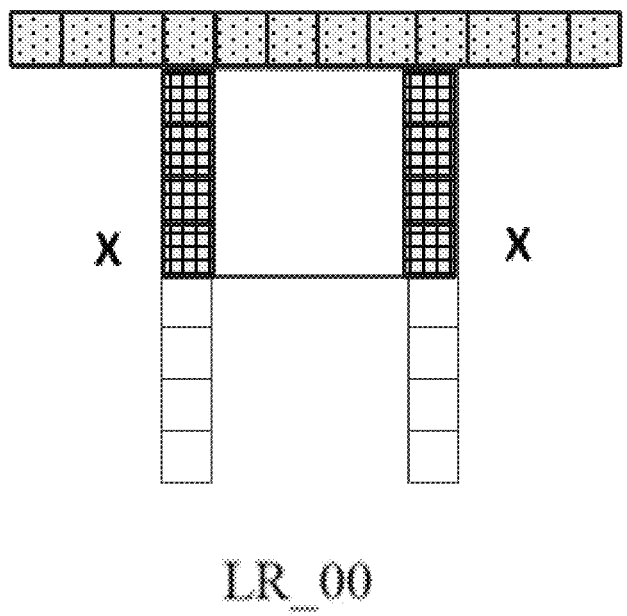
FIG. 9 shows an exemplary scenario when BIP is disabled.
Figure 9:
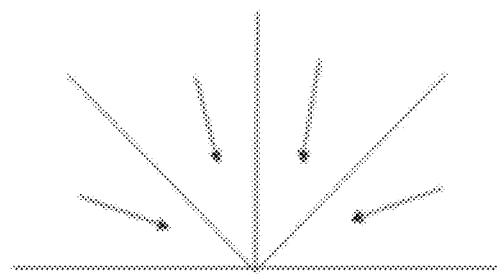

FIG. 9 shows an example scenario in which BIP is disabled because only an upper reference sample row is available for intra prediction (LR_00), left and right sides of neighboring pixels are not available.

BIP is Used by Default and Corresponding Flag is not Signaled

BIP replaces conventional intra prediction by default and a corresponding flag is not signaled when additional reference pixels are available, and the intra prediction mode belongs to the specific sub-range.

Figure 10:
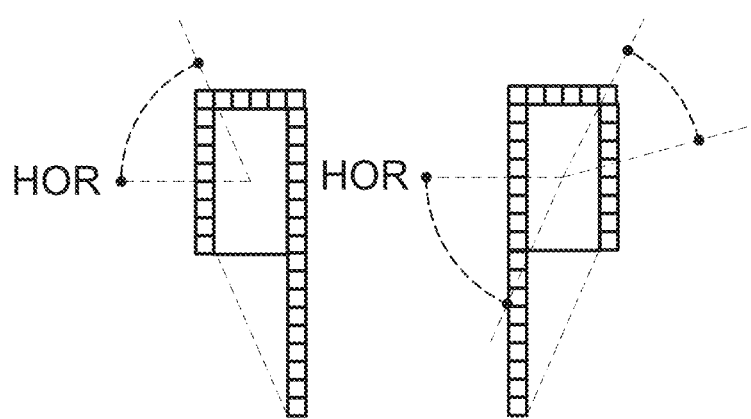
FIG. 10 shows an exemplary scenario when BIP is applied by default.

For example, as shown in FIG. 10, ranges are specified by horizontal (HOR) intra prediction mode number (47) and the ultimate intra prediction mode number specified in Table 1, depending on the block aspect ratio.

TABLE 2

Ultimate intra prediction mode number, horizontally aligned range

| log2(w) − log2(h) | −3 | −2 | −1 | 0 | 1 | 2 | 3 |
|---|---|---|---|---|---|---|---|
| Ultimate intra prediction mode number $I_{IPM\_TL}$ | 46 | 44 | 40 | 35 | 31 | 27 | 25 |
| Ultimate intra prediction mode number $I_{IPM\_LL}$ | 48 | 50 | 54 | 59 | 63 | 64 | 64 |

$I_{IPM\_TL}$, as described in Table 2, represents an intra-predicted using mode $I_{IPM}$ selected for the top-left block; $I_{IPM\_LL}$ a represents an intra-predicted using mode $I_{IPM}$ selected for the lower-left block.

Besides a range aligned with horizontal intra prediction, an additional range is specified for the case in which lower-left side is available (see the rightmost part of FIG. 10). The range for this case is defined by the first available angular intra prediction mode (#3) and the corresponding value from Table 2.

TABLE 3

Ultimate intra prediction mode number, range aligned to the 1$^{st}$ available intra prediction mode

| log2(w) − log2(h) | −3 | −2 | −1 | 0 | 1 | 2 | 3 |
|---|---|---|---|---|---|---|---|
| Ultimate intra prediction mode number $I_{IPM\_TR}$ | N/A | N/A | 6 | 11 | 15 | 19 | 21 |

$I_{IPM\_TR}$, as described in Table 3, represents an intra-predicted using mode $I_{IPM}$ selected for the top-right block.

In addition to the cases described above, BIP replaces conventional intra prediction and a corresponding flag is not signaled when:

the lower-left side and the upper-right side are available and the intra prediction mode is equal either to the one specified in Table 2 or the one specified in Table 1;

the lower-right side and the upper-left side are available and the intra prediction mode is equal the one specified in Table 1.

Figure 11:
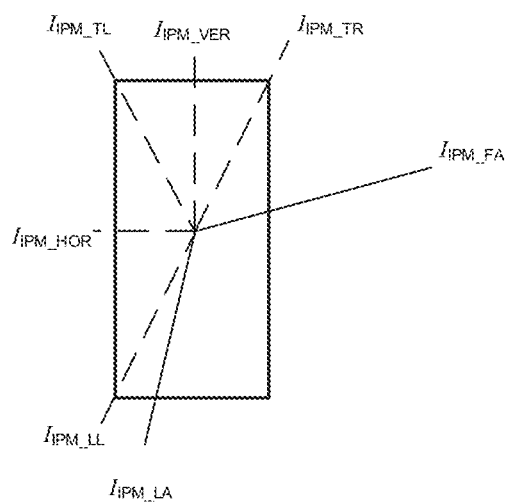
FIG. 11 shows a schematic diagram illustrating examples of intra prediction modes.

Intra prediction mode numbers listed in Table 1 and Table 2 are shown in FIG. 11. Among FIG. 11, $I_{IPM\_LA}$ represents an intra prediction mode $I_{IPM}$ for the last-available intra prediction direction; and $I_{IPM\_FA}$ represents an intra prediction mode $I_{IPM}$ for the first-available intra prediction direction. Intra prediction modes numbers are arranged in ascending order from $I_{IPM\_FA}$ to $I_{IPM\_LA}$. Horizontal (HOR) and vertical (VER) directions modes ($I_{IPM\_HOR}$ and $I_{IPM\_VER}$, respectively) do not depend on block aspect ratio $R_A$. The remaining intra prediction mode numbers shown in FIG. 11 have a dependency on $R_A$ which is given by Table 1 and Table 2.

Figure 12:
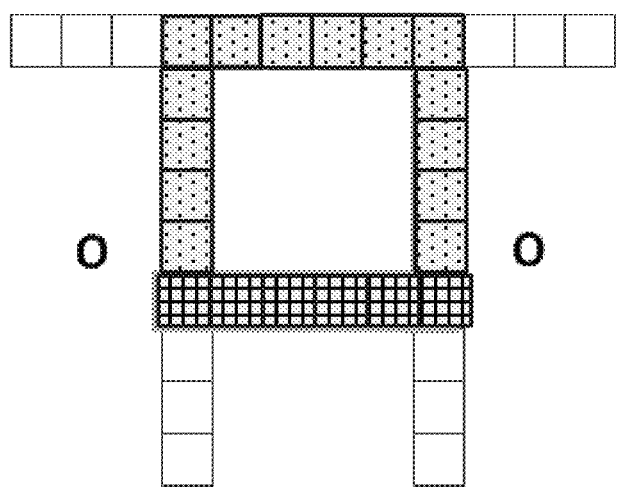
FIG. 12 shows another example scenario when BIP is applied by default.
Figure 12:
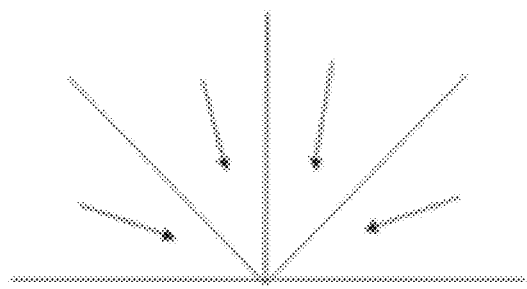

FIG. 12 shows an example scenario when BIP is used by default because not only top sides, but also left and right sides (three sides) of neighboring pixels are available.

BIP is Signaled Using CABAC Contexts (or Probability Model)

A context selection process is performed for a BIP flag when none of the procedures described in sections "BIP is disabled and corresponding flag is not signaled" section and "BIP is used by default and corresponding flag is not signaled" are in effect. A flowchart of an exemplary context selection procedure is given in FIG. 13. Input of this process is given at the first step (block 1302) of the flowchart. It contains:

an intra prediction mode selected for a block ($I_{IPM}$), block width (w) and height (h), a set of available sides of neighboring pixels S, namely: left (sL), right (sR), top (sT), lower-left (sLL), lower-right (sLR) and top-right (sTR) one.

Different contexts could be specified for a probability model, for example low-reliable prediction (denoted as $CTX_{LR}$), medium-reliable prediction (denoted as $CTX_{MR}$) and highly-reliable prediction (denoted as $CTX_{HR}$) cases. Default context is medium-reliable context. The reliability of prediction affects the probability of BIP flag being equal 0, and could be estimated by how close $I_{IPM}$ is to one of the ultimate modes listed above. These modes are determined according to the aspect ratio of a block which is calculated at the next step (block 1304). Such as, $R_A$=log 2(w)−log 2(h). Aspect ratio is represented by a value that is positive if a block is aligned horizontally (i.e. width is greater than height) and negative if the block is aligned vertically. The next step (block 1306) is to select ultimate modes as specified by Table 1 and Table 2. For example, {$I_{IPM\_LL}$, $I_{IPM\_TL}$, $I_{IPM\_TR}$}=LUT($R_A$).

Following decision making on context selection is performed depending on whether left and right sides are available, left side is available, and/or the rest cases Depending on the availability of reference samples sides (S) different ranges are defined and context is selected on the fact of whether IIPM belongs to this range or not.

Figure 14A:
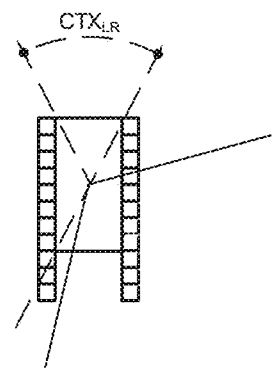
FIG. 14A shows a schematic diagram illustrating a range of intra prediction modes when left and right sides of neighboring pixels are available.

If left and right sides are available at block 1308, {sL, sR}⊇S, CTXLR is selected at block 1328 when top side is not available and IIPM belongs to the range as shown in FIG. 14A (block 1310). At block 1310, that whether top side is not available and whether IIPM belongs to the range as shown in FIG. 14A is determined, for example, ($\{s_T\} \supseteq S$) and ($I_{IPM\_TR} < I_{IPM} < I_{IPM\_LT}$ or $I_{IPM\_LL} < I_{IPM} < I_{IPM\_LA}$).

If left and right sides are available at block 1308, $\{sL, sR\} \supseteq S$, $CTX_{MR}$ is selected at block 1326 when top side is available or IIPM does not belong to the range as shown in FIG. 14A (block 1310).

Figure 13:
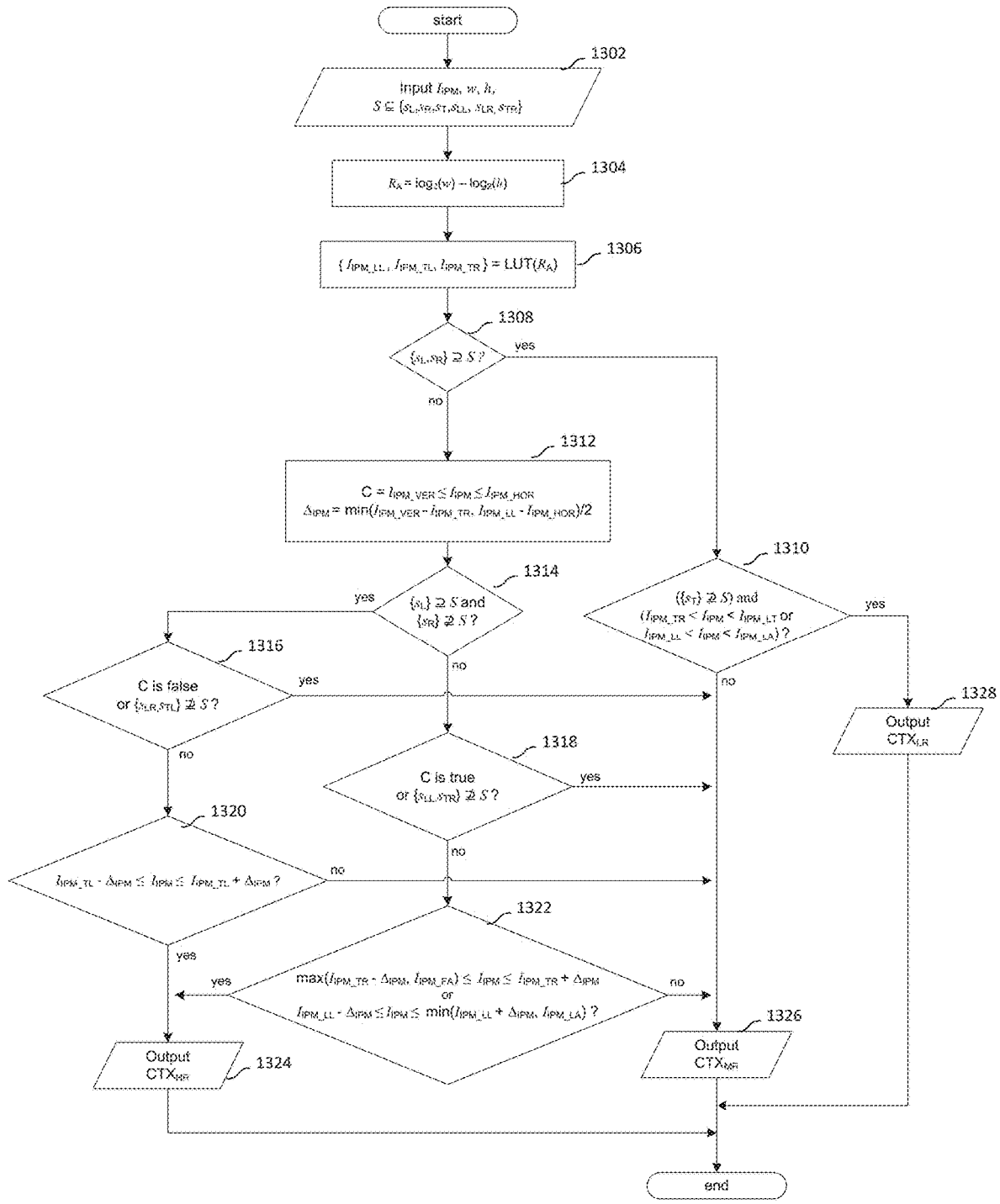
FIG. 13 shows a schematic diagram illustrating an example of a context selection process for a BIP flag.
Figure 14B:
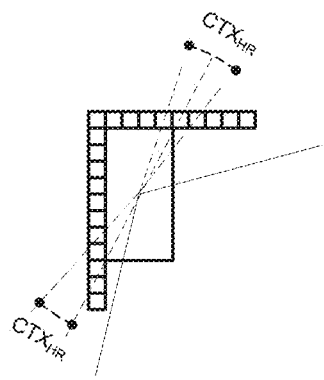
FIG. 14B shows a schematic diagram illustrating a range of intra prediction modes when left and top sides of neighboring pixels are available.

If left and top sides are available, $CTX_{HR}$ is selected if right side is not available and IIPM belongs to the range as shown in FIG. 14B. In FIG. 14A and FIG. 14B, for the rest cases additional calculations may be performed at block 1312, specifically:

whether $I_{IPM}$ falls in between of horizontal and vertical directions (condition C); and value of a threshold difference with the ultimate intra prediction modes ($\Delta_{IPM}$);

where $C = I_{IMP\_VER} \leq I_{IPM} \leq I_{IPM\_HOR}$ $\Delta_{IPM} = \min(I_{IM\_VER} - I_{IPM\_TR}, I_{IPM\_LL} - I_{IPM\_HOR})/2$ The rest of the context selection process is shown in FIG. 13, which results in selection of one of the above-specified contexts depending on the prediction reliability estimation. When left side is available, and right side is not available at block 1314, whether C is true or $\{s_{LL}, s_{TR}\} \supseteq S$ is determined at block 1318. When C is true or $\{s_{LL}, s_{TR}\} \supseteq S$, $CTX_{MR}$ is selected at block 1326. If C is false and $\{s_{LL}, s_{TR}\} \supseteq S$, whether $\max(I_{IPM\_TR} - \Delta_{IPM}, I_{IPM\_FA}) \leq I_{IPM} \leq I_{IPM\_TR} + \Delta_{IPM}$ or $I_{IPM\_LL} - \Delta_{IPM} \leq I_{IPM} \leq \min(I_{IPM\_LL} + \Delta_{IPM}, I_{IPM\_LA})$ is determined at block 1322. If yes at block 1322, $CTX_{MR}$ is selected at block 1326; otherwise $CTX_{HR}$ is selected at block 1324.

If left side is not available, or right side is available at block 1314, whether C is false or $\{s_{LR}, s_{TL}\} \supseteq S$ is determined at block 1316. If C is false or $\{s_{LR}, s_{TL}\} \supseteq S$, $CTX_{MR}$ is selected at block 1326. If C is true and $\{s_{LR}, s_{TL}\} \supseteq S$, whether $I_{IPM\_TL} - \Delta_{IPM} \leq I_{IPM} \leq I_{IPM\_TL} + \Delta_{IPM}$ is determined at block 1320. If yes at block 1320, $CTX_{HR}$ is selected at block 1324; otherwise $CTX_{MR}$ is selected at block 1326.

There may be fewer or more than three different contexts. Generally, a context could be defined as a function of closest ultimate intra prediction mode;

difference between $I_{IPM}$ and a number of that ultimate intra prediction mode.

Thus, more than just one context could be provided per an ultimate intra prediction, e.g., if several threshold difference values $\Delta_{IPM}$ are introduced.

Figure 15:
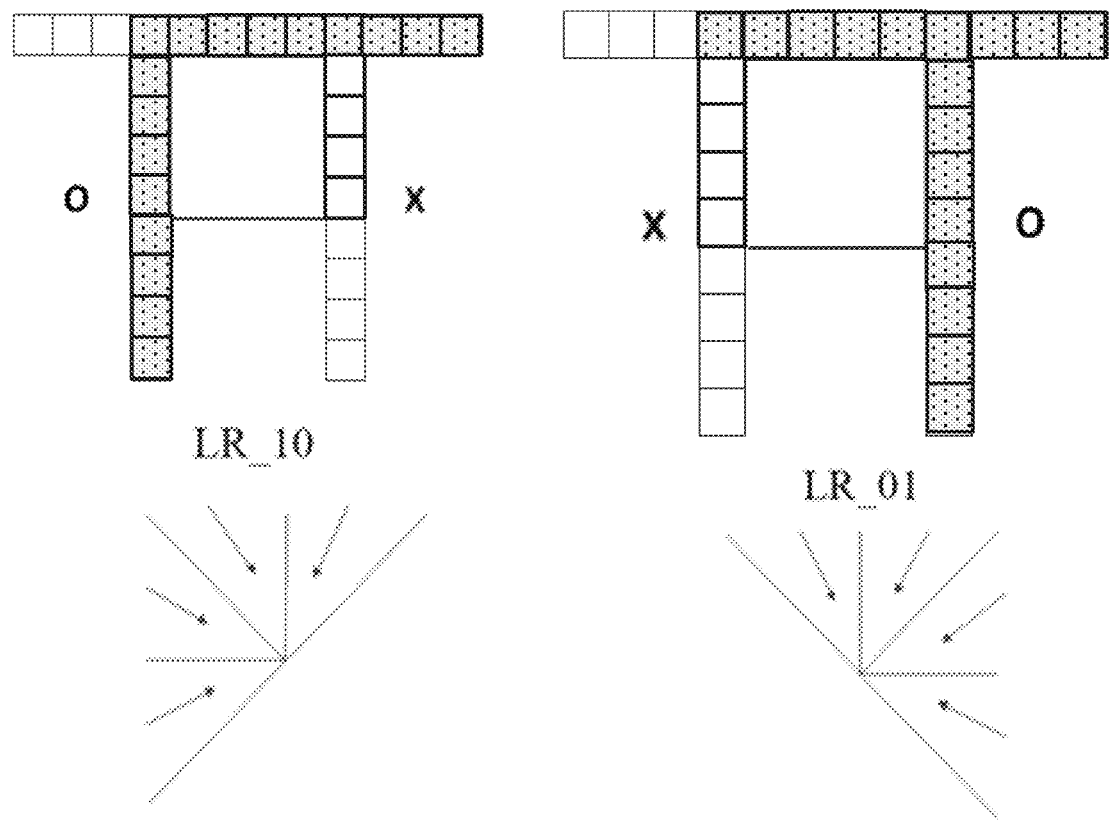
FIG. 15 shows an exemplary scenario in which BIP is used in a context selection process.

FIG. 15 shows an example scenario when BIP is used by context selection process when either top and left reference sample sides (LR_10) or top and right sides (LR_01) are available for intra prediction.

Exemplary Encoding Processes

Figure 16:
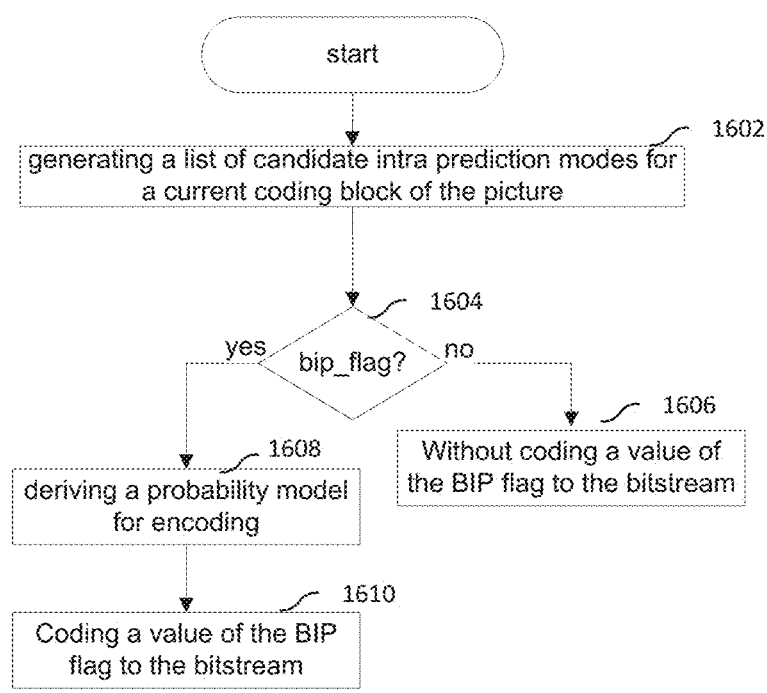
FIG. 16 is a flowchart illustrating an example of a method of coding a bitstream.

FIG. 16 is a flowchart of an example of a method of encoding (or compressing) a bitstream, which may be performed by the source device 102 as shown in FIG. 1, or by the video encoder 200 as shown in FIG. 2. Process 1600 is an example for the encoder's processing. Encoder-side changes introduced by the present disclosure primarily relate to the selection of intra prediction mode using rate-distortion optimization (RDO) procedure. This procedure may notably comprise the following blocks.

Block 1602, the encoder generates a list of candidate intra prediction modes for a current coding block of the picture, where the list of candidate intra prediction modes comprises at least one BIP mode.

Block 1604, the encoder determines whether a BIP flag is to be signaled in the bitstream according to prediction related information, where the BIP flag indicates a BIP mode selected for the current coding block. The prediction related information comprises:

number and position of available primary reference samples;

intra prediction mode index;

aspect ratio of a block being predicted; and/or size of a block being predicted.

Exemplary determining whether BIP flag is to be signaled in the bitstream described earlier and shown in FIG. 1 to FIG. 15.

Block 1606, when the BIP flag is not to be signaled in the bitstream, the encoder does not code value of the BIP flag to the bitstream. The two examples are described earlier at sections "BIP is disabled and corresponding flag is not signaled" and "BIP is used by default and corresponding flag is not signaled."

Block 1608, when the BIP flag is to be signaled in the bitstream, the encoder derives a probability model for encoding from the prediction related information. Then at block 1610, the encoder codes a value of the BIP flag to the bitstream using the probability model. The example is described earlier at section "BIP is signaled using CABAC contexts (or probability model)."

Figure 17:
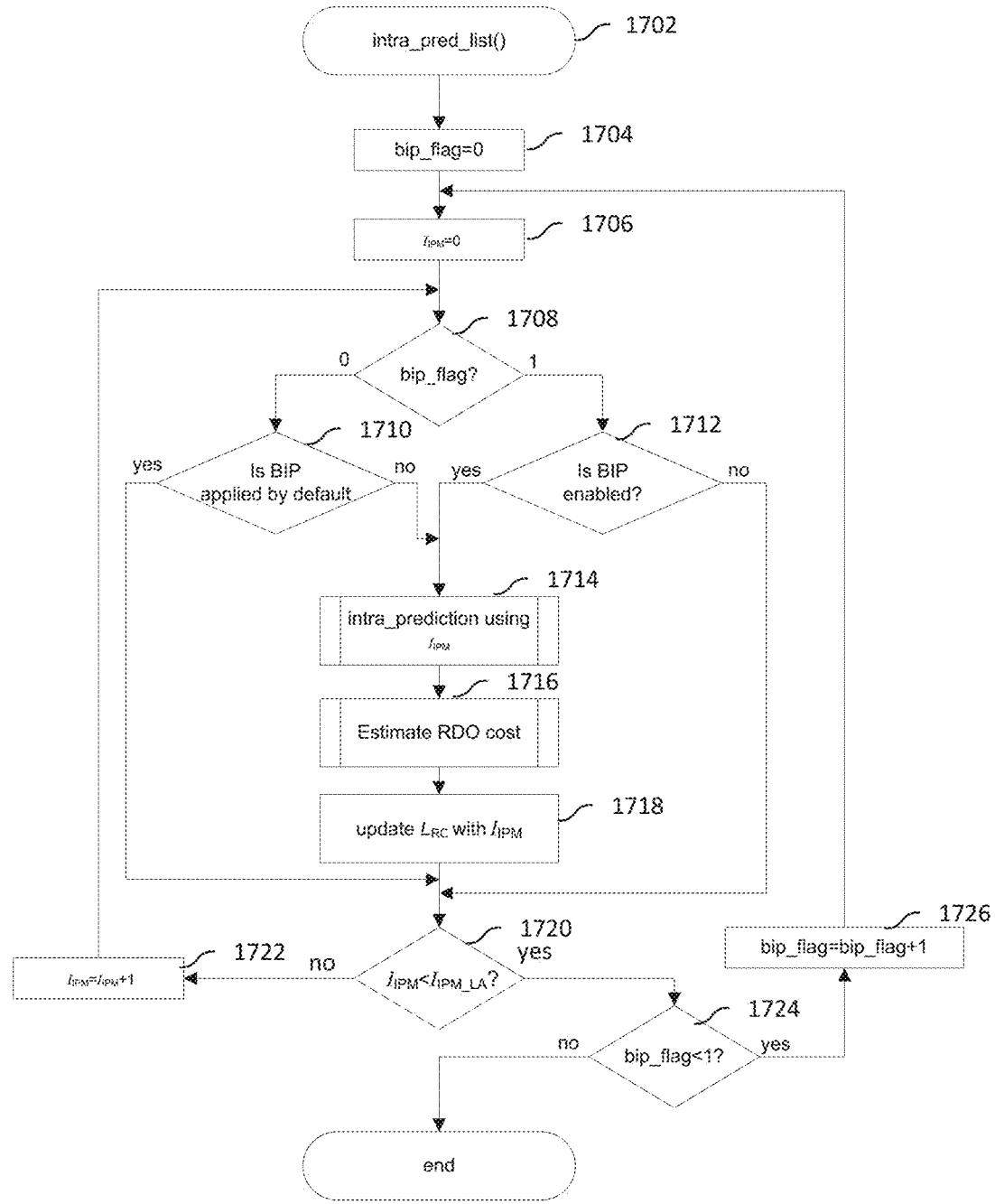
FIG. 17 is a flowchart illustrating an example of a method of coding a bitstream.

FIG. 17 is another flowchart of an example of a method of encoding (or compressing) a bitstream, which may be performed by the source device 102 as shown in FIG. 1, or by the video encoder 200 as shown in FIG. 2. Process 1700 is an example for the encoder's processing. Encoder-side changes introduced by the present disclosure primarily relate to the selection of intra prediction mode using rate-distortion optimization (RDO) procedure. This procedure may notably comprise:

preparing a list of candidate intra prediction modes $L_{RC}$ using cost estimation based on estimation of intra prediction residual; and selecting a best intra prediction out of the $L_{RC}$ list using cost estimation based on coding of intra prediction residual.

One of the possible implementation forms involves a particular way of preparing a list of candidate intra prediction modes $L_{RC}$. Besides the numbers of intra prediction modes, The $L_{RC}$ list would also contain the values of bip_flag associated with the corresponding intra prediction modes. FIG. 17 shows an exemplary flowchart for preparing a list of candidate intra prediction modes and corresponding values of bip_flag using cost estimation based on estimation of intra prediction residual. According to the flowchart 1700, available intra prediction modes are scanned twice having the value of bip_flag equal 0 and 1, respectively. The flowchart 1700 also skips Rate-Distortion Optimization (RDO) cost estimations for the cases when bip_flag is incompliant with the intra prediction mode $I_{IPM}$ being checked.

At block 1702, the encoder generates intra_pred_list( ) for a current block. At beginning, bip_flag is 0 as shown at block 1704, and the $I_{IPM}$ is 0 as shown at block 1706.

At block 1708, the encoder determines that bip_flag is 0 or bip_flag is 1. If the bip_flag is 0, the encoder determines whether the BIP is applied by default at block 1710. If the bip_flag is 1, the encoder determines whether the BIP is enabled at block 1712.

If the BIP is not applied by default, or the BIP is enabled, the encoder uses $I_{IPM}$ as the intra_prediction modes of the current block at block 1714. The encoder performs RDO cost estimation at block 1716. Then, the encoder prepares a list of candidate intra prediction modes $L_{RC}$ using RDO cost estimation based on estimation of intra prediction residual at block 1718, where the $L_{RC}$ list may contain the values of bip_flag associated with the corresponding intra prediction modes. Then at block 1718, a best intra prediction is selected or updated out of the $L_{RC}$ list using cost estimation based on coding of intra prediction residual.

After updating $L_{RC}$ with $I_{IPM}$ at block 1718, or the BIP is applied by default at block 1710, or the BIP is not enabled at block 1712, the encoder determines whether $I_{IPM}$ is the last-available intra prediction $I_{IPM\_LA}$ at block 1720. If $I_{IPM}$ is not the last-available intra prediction $I_{IPM\_LA}$, $I_{IPM}=I_{IPM}+1$ at block 1722. After $I_{IPM}=I_{IPM}+1$, the process goes back to block 1708 to determine that bip_flag is 0 or bip_flag is 1. If $I_{IPM}$ is the last-available intra prediction $I_{IPM\_LA}$, the encoder determines whether bip_flag<1 at block 1724. If the bip_flag<1, bip_flag=bip_flag+1 at block 1726. After bip_flag=bip_flag+1, the process goes back to block 1706.

Exemplary determining whether BIP is enabled or not, and exemplary determining whether BIP is applied by default are described earlier and shown in FIG. 1 to FIG. 15.

In this embodiment, a single list of candidate intra prediction modes $L_{RC}$ is used. However, it is possible to prepare two separate lists and select a pair {bip_flag, $I_{IPM}$} out of the two lists. In this case, the embodiment still would not affect the process of selecting a best intra prediction out of the $L_{RC}$ list. The only difference with FIG. 17 is that bip_flag loop is external to intra_pred_list process, and the list $L_{RC}$ to be updated is selected according to the input value of bip_flag.

Exemplary Decoding Processes

Figure 18:
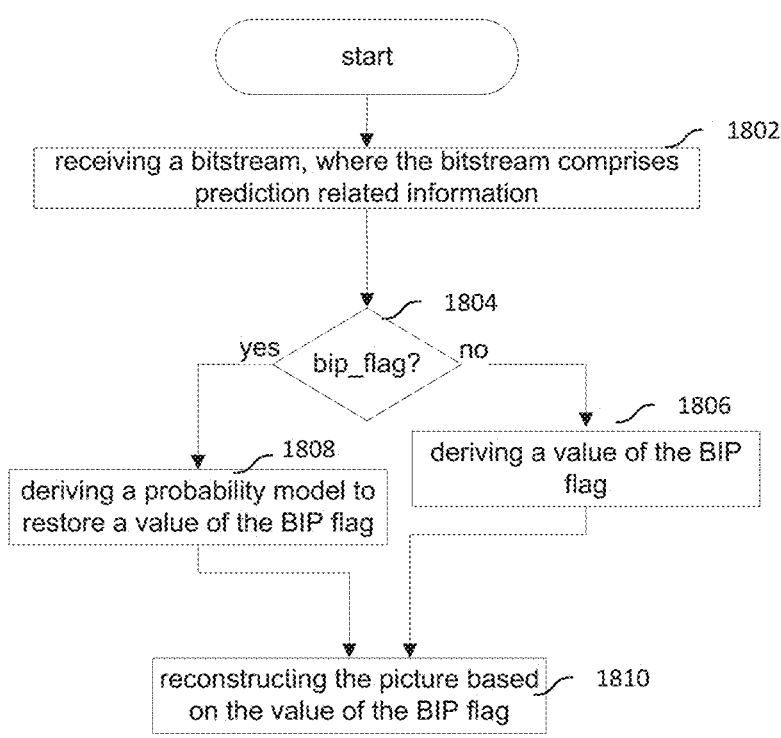
FIG. 18 is a flowchart illustrating an example of a method of decoding an encoded bitstream.

FIG. 18 is an exemplary flowchart 1800 to decode (or parse or decompress) an coded bitstream, which is performed by the destination device 104 as shown in FIG. 1, or the video decoder 300 as shown in FIG. 3. Process 1800 is an example for the decoder's processing.

Block 1802, the decoder receives a bitstream, where the bitstream comprises prediction related information. The prediction related information comprises:
 number and position of available primary reference samples;
 intra prediction mode index;
 aspect ratio of a block being predicted; and/or
 size of a block being predicted.

Block 1804, the decoder determines whether a BIP flag is signaled in the bitstream according to the prediction related information, where the BIP flag indicates a BIP mode selected for the current coding block.

Exemplary determining whether BIP flag is signaled in the bitstream described earlier and shown in FIG. 1 to FIG. 15.

Block 1806, when the BIP flag is not signaled in the bitstream, the decoder derives a value of the BIP flag from the prediction related information. The two examples are described earlier at sections "BIP is disabled and corresponding flag is not signaled" and "BIP is used by default and corresponding flag is not signaled."

Block 1808, when the BIP flag is signaled in the bitstream, the decoder derives a probability model for decoding from the prediction related information. Then the decoder restores a value of the BIP flag using the probability model. The example is described earlier at section "BIP is signaled using CABAC contexts (or probability model)."

Block 1810, the decoder reconstructs the picture based on the value of the BIP flag.

Figure 19:
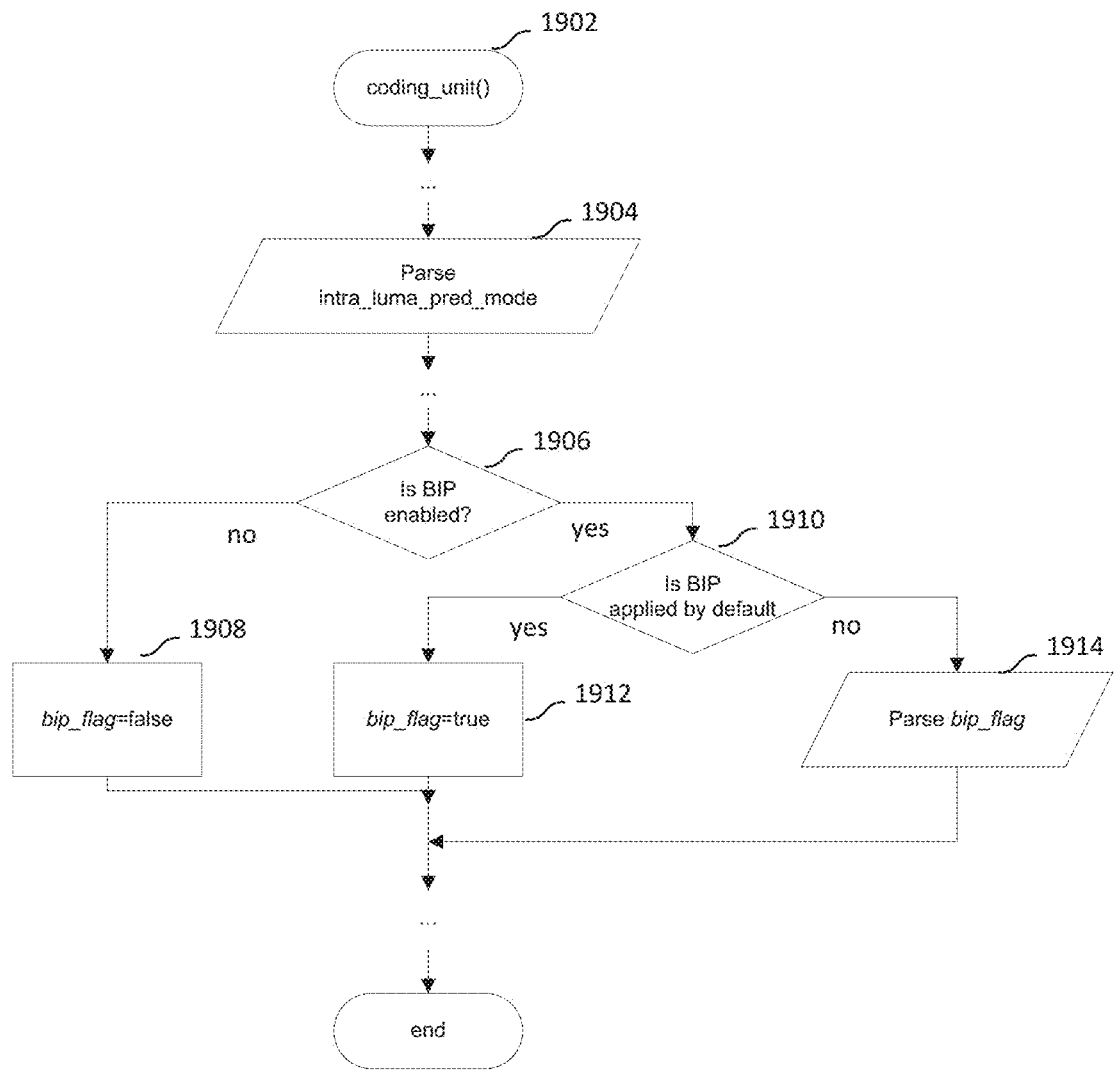
FIG. 19 is a flowchart illustrating an example of a method of decoding an encoded bitstream.

FIG. 19 is another exemplary flowchart 1900 to decode (or parse or decompress) an coded bitstream, which is performed by the destination device 104 as shown in FIG. 1, or the video decoder 300 as shown in FIG. 3. Process 1900 is an example for the decoder's processing.

Parsing of prediction-related information from the bitstream is performed by a coding_unit procedure at block 1902. It may comprise various symbols, but for intra predicted blocks, intra prediction mode should be parsed in the procedure 1900. In the embodiment it is proposed to conditionally parse the value of bip_fag after intra_luma_pred_mode is parsed at block 1904. Depending on intra prediction mode, shape and size of the block, the value of bip_flag is either assigned or parsed from the bitstream. Detailed information is disclosed above from FIG. 1 to FIG. 15. The decoder determines whether BIP is enabled or not at block 1906. If the BIP is not enabled, the bip_flag is false at block 1908. If the BIP is enabled, the decoder determines whether BIP is applied by default at block 1910. When BIP is applied by default, the bip_flag is true at block 1912. When BIP is not applied by default, the decoder parses bip_flag at block 1914. When decoding bip_flag value, a context could be selected, based on intra prediction mode, shape and size of the block. Exemplary context selection is described earlier and shown in FIG. 13. Exemplary determining whether BIP is enabled or not, and exemplary determining whether BIP is applied by default are described earlier and shown in FIG. 1 to FIG. 15.

Figure 20:
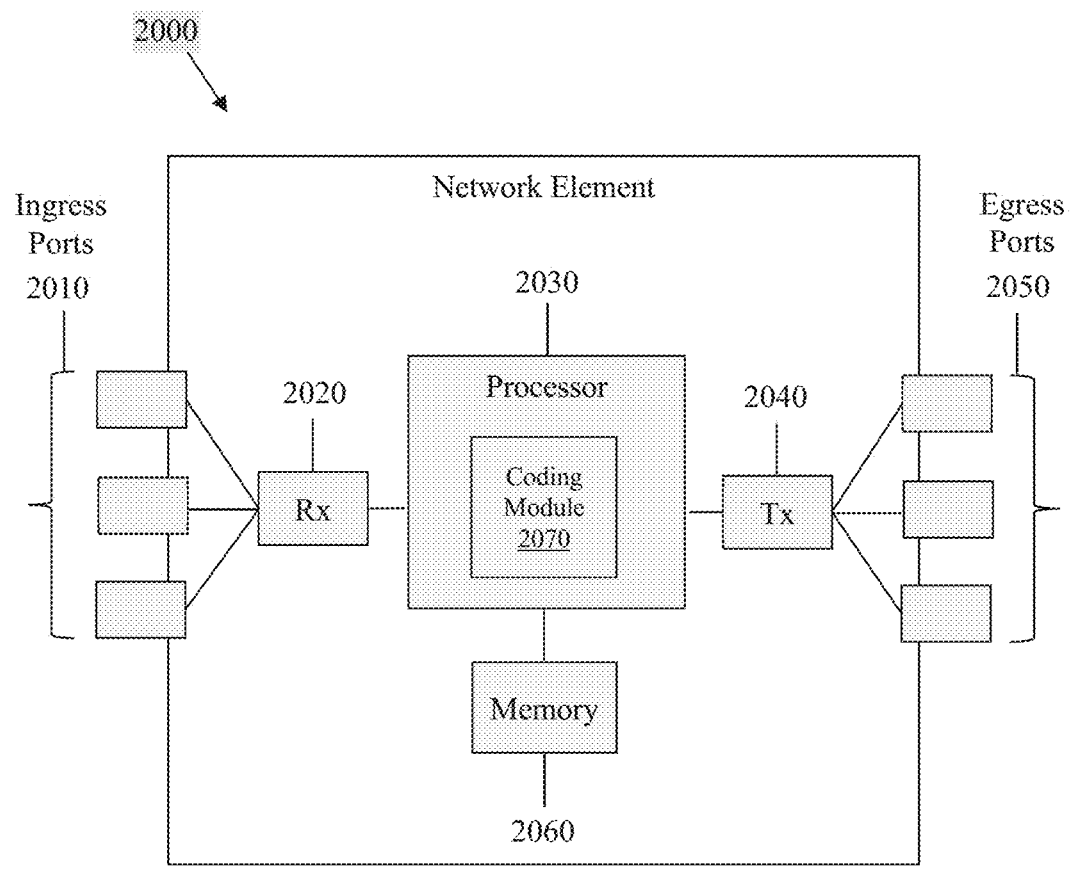
FIG. 20 is a block diagram of a network element that can be used to implement various embodiments.

FIG. 20 is a schematic diagram of a network element 2000. The network element 2000 is suitable for implementing the disclosed embodiments as described herein. The network element 2000 may be the encoder or the decoder to perform the methods described above. The network element 2000 comprises ingress ports 2010 and receiver units (Rx) 2020 for receiving data; a processor, logic unit, or central processing unit (CPU) 2030 to process the data; transmitter units (Tx) 2040 and egress ports 2050 for transmitting the data; and a memory 2060 for storing the data. The network element 2000 may also comprise optical-to-electrical (OE) components and electrical-to-optical (EO) components coupled to the ingress ports 2010, the receiver units 2020, the transmitter units 2040, and the egress ports 2050 for egress or ingress of optical or electrical signals.

The processor 2030 is implemented by hardware and software. The processor 2030 may be implemented as one or more CPU chips, cores (e.g., as a multi-core processor), field-programmable gate arrays (FPGAs), application specific integrated circuits (ASICs), and digital signal processors (DSPs). The processor 2030 is in communication with the ingress ports 2010, receiver units 2020, transmitter units 2040, egress ports 2050, and memory 2060. The processor 2030 includes a coding module 2070. The coding module 2070 implements the disclosed embodiments described above. For instance, the coding module 2070 implements the methods of compressing/decompressing the last coding or prediction block. The inclusion of the coding module 2070 therefore provides a substantial improvement to the functionality of the network element 2000 and effects a transformation of the network element 2000 to a different state. Alternatively, the coding module 2070 is implemented as instructions stored in the memory 2060 and executed by the processor 2030.

The memory 2060 comprises one or more disks, tape drives, and solid-state drives and may be used as an over-flow data storage device, to store programs when such programs are selected for execution, and to store instructions and data that are read during program execution. The memory 2060 may be volatile and/or non-volatile and may be read-only memory (ROM), random-access memory (RAM), ternary content-addressable memory (TCAM), and/or static random-access memory (SRAM).

The techniques disclosed herein can save overhead to determine that bidirectional intra prediction modes are not signaled and used by default, or determine that bidirectional intra prediction modes are not signaled and not used. Even for the bidirectional intra prediction modes are signaled based on different contexts, the techniques can increase the reliability of the BIP. The BIP mode may be a DWDIP mode. Correspondingly, the BIP flag may be a DWDIP flag.

The techniques may also be beneficial in the following aspects:

Increasing the compression performance of BIP within partitioning frameworks with flexible block coding order with negligible increase of computational complexity at both encoder and decoder sides;

It can be used in many potential applications in hybrid video coding paradigms that are compatible with the HM software and the VPX video codec family as well as the JEM software, the VPX/AV1 video codec family and other similar platforms that are a state-of-the-art and a next-generation video coding frameworks, respectively.

Estimation of probability that bidirectional prediction provides lesser RDO cost than single-directional prediction is improved by using prediction-related information. More accurate probability modelling provides better efficiency of entropy encoding and consequently, bitrate reduction.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

What is claimed is:

1. A method comprising:
generating a list of candidate intra prediction modes for a current coding block of a picture being encoded, wherein the list of candidate intra prediction modes comprises a bidirectional intra prediction (BIP) mode;
determining, according to prediction related information, whether a BIP flag is to be signaled in a bitstream of the picture, wherein the BIP flag indicates that the BIP mode is selected for the current coding block, and wherein the prediction related information comprises at least one of: numbers and positions of available primary reference samples of the current coding block, an intra prediction mode index defining a direction of a candidate intra prediction mode, or a size of the current coding block;
when determining that the BIP mode is not applied for intra prediction or applied by default, determining not to signal the BIP flag in the bitstream; and
when determining that the BIP flag is to be signaled in the bitstream, deriving, from the prediction related information, a probability model for encoding, and coding a value of the BIP flag to the bitstream using the probability model; and
wherein determining whether the BIP flag is to be signaled comprises:
determining that the BIP mode is disabled, and the BIP flag is not to be signaled in the bitstream, when:
both a width and a height of the current coding block equal a predetermined size, or
the width of the current coding block is greater than a first maximum threshold, or
the height of the current coding block is greater than a second maximum threshold.

2. The method of claim 1, wherein determining whether the BIP flag is to be signaled comprises:
determining that the BIP mode is enabled, and the BIP flag is applied by default and is not to be signaled in the bitstream; or
determining that the BIP mode is disabled, and the BIP flag is not to be signaled in the bitstream.

3. The method of claim 1, wherein determining whether the BIP flag is to be signaled comprises:
when a primary reference sample in a top side of the current coding block is not available, determining that the BIP mode is disabled and the BIP flag is not to be signaled in the bitstream; or
when primary reference samples in left and right sides of the current coding block are not available, determining that the BIP mode is disabled and the BIP flag is not to be signaled in the bitstream.

4. The method of claim 1, wherein determining whether the BIP flag is to be signaled comprises:
when the intra prediction mode index is greater than a range start value and is less than a range end value, and when a primary reference sample in a lower side or upper side of the current coding block is available, determining that the BIP mode is enabled, and the BIP flag is applied by default and is not to be signaled in the bitstream, wherein the range start value and the range end value are determined using a width and a height of the current coding block; or when the intra prediction mode index is less than a range start value or is greater than a range end value, and when primary reference samples in left and right sides of the current coding block are available, determining that the BIP mode is disabled, and the BIP flag is not to be signaled in the bitstream, wherein the range start value and the range end value are determined using a width and a height of the current coding block; or determining that the BIP mode is disabled, and the BIP flag is not to be signaled in the bitstream, when only a primary reference sample in left or right side of the current coding block is available, and when one of following is satisfied:

the width of the current coding block is equal to a first predetermined size, and a difference between the intra prediction mode index and an index of a horizontal mode is equal to or less than a first threshold; or the height of the current coding block is equal to a second predetermined size and a difference between the intra prediction mode index and an index of a vertical mode is equal to or less than a second threshold.

5. The method of claim 1, wherein determining whether the BIP flag is to be signaled comprises:

determining a reliability of the BIP mode, wherein the reliability of the BIP mode includes a reliability obtained using low-reliable prediction (CTXLR), a reliability obtained using medium-reliable prediction (CTXMR), or a reliability obtained using highly-reliable prediction (CTXHR).

6. The method of claim 5, wherein determining the reliability of the BIP mode comprises:

when primary reference samples in left and right sides of the current coding block are available, a primary reference sample in a top side of the current coding block is not available, and the intra prediction mode index belongs to a first predefined range, determining the reliability of the BIP mode using CTXLR.

7. The method of claim 5, wherein determining the reliability of the BIP comprises:

when primary reference samples in left and top sides of the current coding block are available, a primary reference sample in right side of the current coding block is not available, and the intra prediction mode index belongs to a second predefined range, determining the reliability of the BIP mode using CTXHR.

8. The method of claim 5, wherein determining the reliability of the BIP comprises:

determining the reliability of the BIP mode using CTXMR, when primary reference samples in left and right sides of the current coding block are available and one of following is satisfied:

a primary reference sample in top side of the current coding block is available; or the intra prediction mode index does not belong to a first predefined range.

9. A method comprising:

receiving a bitstream of a picture, wherein the bitstream comprises prediction related information, and wherein the prediction related information includes at least one of: numbers and positions of available primary reference samples of a current coding block of the picture, a intra prediction mode index defining a direction of a candidate intra prediction mode, or a size of the current coding block;

determining, based on the prediction related information, whether a bidirectional intra prediction (BIP) flag is signaled in the bitstream for the current coding block;

when the BIP flag is not signaled in the bitstream, determining that a BIP mode is not applied for intra prediction or applied by default based on the prediction related information; and when the BIP flag is signaled in the bitstream, deriving a probability model from the prediction related information to restore a value of the BIP flag, and reconstructing the current coding block based on the value of the BIP flag; and wherein the prediction related information comprises the size of the current coding block, and wherein determining whether the BIP flag is signaled comprises:

determining that the BIP mode is disabled and the BIP flag is not signaled in the bitstream when:

both a width and a height of the current coding block equal a predetermined size, or the width of the current coding block is greater than a first maximum threshold, or the height of the current coding block is greater than a second maximum threshold.

10. The method of claim 9, wherein determining whether the BIP flag is signaled comprises:

determining that the BIP mode is enabled, and the BIP flag is applied by default and is not signaled in the bitstream; or determining that the BIP mode is disabled, and the BIP flag is not signaled in the bitstream.

11. The method of claim 9, wherein the prediction related information comprises the numbers and positions of the available primary reference samples, and wherein determining whether the BIP flag is signaled comprises:

when a primary reference sample in a top side of the current coding block is not available, determining that the BIP mode is disable and the BIP flag is not signaled in the bitstream; or when primary reference samples in left and right sides of the current coding block are not available, determining that the BIP mode is disabled and the BIP flag is not signaled in the bitstream.

12. The method of claim 9, wherein the prediction related information comprises the numbers and positions of the available primary reference samples and the intra prediction mode index, and wherein determining whether the BIP flag is signaled comprises:

when the intra prediction mode index is less than a range start value or is greater than a range end value, and when primary reference samples in left and right sides of the current coding block are available, determining that the BIP mode is disabled, and the BIP flag is not signaled in the bitstream, wherein the range start value and the range end value are determined using a width and a height of the current coding block; or determining that the BIP mode is disabled, and a BIP flag is not signaled in the bitstream when only a primary reference sample in left or right side of the current coding block is available, and when one of following is satisfied:

the width of the current coding block is 4 pixels, and a difference between the intra prediction mode index and an index of a horizontal mode is equal to or less than a first threshold; or the height of the current coding block is 4 pixels, and a difference between the intra prediction mode index and an index of a vertical mode is equal to or less than a second threshold.

13. The method of claim 9, wherein the prediction related information comprises the numbers and positions of available primary reference samples and the intra prediction mode index, and wherein determining whether the BIP flag is signaled comprises:

when the intra prediction mode index is greater than a range start value and is less than a range end value, and when a primary reference sample in a lower side or upper side of the current coding block is available, determining that the BIP mode is enabled, and the BIP flag is applied by default and is not signaled in the bitstream, wherein the range start value and the range end value are determined using a width and a height of the current coding block.

14. The method of claim 9, wherein determining whether that BIP flag is signaled comprises:

determining a reliability of the BIP mode according to the prediction related information, where the reliability of the BIP mode includes a reliability obtained using low-reliable prediction (CTXLR), a reliability obtained using medium-reliable prediction (CTXMR) or a reliability obtained using highly-reliable prediction (CTXHR).

15. The method of claim 14, wherein determining the reliability of the BIP mode comprises:

when primary reference samples in left and right sides of the current coding block are available, a primary reference sample in a top side of the current coding block is not available, and IIPM belongs to a first predefined range, determining the reliability of the BIP mode using CTXLR.

16. The method of claim 14, wherein determining the reliability of the BIP mode comprises:

when primary reference samples in left and top sides of the current coding block are available, a primary reference sample in right side of the current coding block is not available, and IIPM belongs to a second predefined range, determining the reliability of the BIP mode using CTXHR.

17. The method of claim 14, wherein determining the reliability of the BIP comprises:

determining the reliability of the BIP mode using CTXMR when primary reference samples in left and right sides of the current coding block are available and one of following is satisfied:
a primary reference sample in top side of the current coding block is available; or
the intra prediction mode index does not belong to a first predefined range.

18. A decoder comprising:
a non-transitory memory comprising instructions; and
one or more processors in communication with the memory, wherein the instructions, when executed by the one or more processors, cause the decoder to:
receive a bitstream of a picture that is encoded, wherein the bitstream comprises prediction related information, and wherein the prediction related information includes at least one of: numbers and positions of available primary reference samples of a current coding block of the picture, an intra prediction mode index defining a direction of a candidate intra prediction mode, or a size of the current coding block;
determine, based on the prediction related information, whether a bidirectional intra prediction (BIP) flag is signaled in the bitstream for the current coding block;
when the BIP flag is not signaled in the bitstream, determine that a BIP mode is not applied for intra prediction or applied by default based on the prediction related information; and
when the BIP flag is signaled in the bitstream, derive a probability model from the prediction related information to restore a value of the BIP flag, and reconstruct the current coding block based on the value of the BIP flag; and
wherein the prediction related information comprises the size of the current coding block, and wherein determining whether the BIP flag is signaled comprises:
determining that the BIP mode is disabled and the BIP flag is not signaled in the bitstream when:
both a width and a height of the current coding block equal a predetermined size, or
the width of the current coding block is greater than a first maximum threshold, or
the height of the current coding block is greater than a second maximum threshold.

* * * * *